United States Patent
Kirschey

[15] 3,683,643
[45] Aug. 15, 1972

[54] FLEXIBLE COUPLING

[72] Inventor: Gerhard Kirschey, Ittertaler Strasse 52, 56 Wuppertal-Vohwinkel, Germany

[22] Filed: April 13, 1971

[21] Appl. No.: 133,684

[30] Foreign Application Priority Data

April 23, 1970 Germany..........P 20 19 608.1

[52] U.S. Cl. ................................................64/11 R
[51] Int. Cl. .................................................F16d 3/52
[58] Field of Search ..............................64/11 R, 13

[56] References Cited

UNITED STATES PATENTS

| 2,982,118 | 5/1961 | Franceschetti et al. | 64/13 |
| 3,238,742 | 3/1966 | Martorana | 64/11 |
| 3,296,827 | 1/1967 | Landon, Jr. et al. | 64/11 |

Primary Examiner—Kenneth W. Sprague
Attorney—Ernest G. Montague

[57] ABSTRACT

A flexible coupling for torque transmission, which comprises an annular coupling element of flexible material having metallic bushings for the reception of securing screws and disposed between the input side and the output side of the coupling. The coupling element is mountable free from pretension by the securing screws directed alternately in radial and axial direction. A cylindrical armature sleeve is provided which constitutes one coupling part and is smooth and free of projections and recesses except threaded bores for the securing screws, as well as hold the securing screws disposed in radial direction. A flange hub constitutes another coupling part and is smooth and free of projections and recesses except threaded bores in the flange hub for the securing screws disposed in axial direction with a plane surface of a flange of the flange hub. The armature sleeve and the flange hub cooperate with each other. The elastic parts of the coupling have a pressure pretension by the securing screws disposed in radial direction. Metal bushings directed in radial, as well as in axial direction are provided and received within the cross-section configuration of the cross-section of the coupling element for the reception of the securing screws in the direction to its coupling-sided securing engagement face relative to the coupling element including columnar connecting members between the bushings secured in the other direction are disposed projectingly, and the coupling element has in its unmounted tension-free state the configuration of an irregular polygon.

5 Claims, 3 Drawing Figures

Patented Aug. 15, 1972

INVENTOR:
Gerhard Kirseley
BY: [signature]
attorney

Patented Aug. 15, 1972

INVENTOR:
Gerhard Kirschey
BY: Ernest Montague
Attorney

FLEXIBLE COUPLING

The present invention relates to a flexible coupling for torque transmission, whereby between the input side and the output side of the coupling a coupling element is provided of elastic material, as by example rubber, which is annular and has metallic bushings for reception of securing screws.

Flexible couplings for torque transmission in accordance with the basic understanding are known from the disclosure of the German Pat. No. 1,078,821. In the coupling disclosed therein for the torque transmission an annular coupling element is consisting of rubber, which is inserted between the driving part and the driven part of the coupling. This coupling is equipped with a plurality of metal bushings running exclusively in axial direction, through which are fed through exclusively axially securable securing screws and are alternately connected with the driving and the driven side.

In case of application of such a coupling element, it is possible, to transmit the desired torque. The drawback of a coupling equipped with such previously known coupling element, is to be seen in the fact that it is structurally too voluminous and too cumbersome. Furthermore for the provision of the screw heads of the axial securing screws projecting relative to the coupling element, recesses must be provided. Also concerning the mounting difficulties result, because the previously known coupling element can be pretensioned only with the assistance of a tension band.

Starting with a coupling element of the previously known type, it is one object of the present invention to provide a flexible coupling which, on the one hand has such coupling element and, on the other hand, to form a coupling equipped with such coupling element, which is structurally simpler less cumbersome and better, without interfering with its operational function.

This aim is brought about, in accordance with the present invention, in advantageous manner substantially such, that the coupling element mountable free of a tensioning band is secured by securing means directed alternately in radial and axial direction, whereby the securing screws arranged in radial direction holding, by example, with an all around smooth, projection-free and with the exception of the thread bores for the securing screws recess-free, cylindrical armature sleeve, as the one coupling part, and the securing screws standing in axial direction, holding by example with the plane face of a flange of a likewise all around smooth, flange hub free of projections and likewise recess-free with the exception of the thread bores in the flange for the securing screws, as the other part of the coupling cooperate with each other, whereby the elastic parts of the advantage concerning the mounting, that no tension band has to be put around the coupling element, in order, as the known coupling elements, to pretension and to mount the same. In connection with the subject matter of the present invention rather the axial securing screws are at first inserted, while by the tightening of the securing screws standing in radial direction the required pretension is brought about.

Since in accordance with the proposal of the present invention merely all-sided smooth coupling parts are required, the coupling, in accordance with the present invention, is applicable universally to the highest degree and suitable as attached coupling, whereby it can be connected in one application as self-sustaining structure unit, with a device, machine, or the like to be equipped with a coupling, with which then the other coupling receive a pressure pretension by the securing screws extending in radial direction.

By the practical realization it has been brought about on the one hand, by the construction and, on the other hand, by the manufacturing side to obtain an extremely simple and absolutely acceptable coupling, in which as coupling parts merely a flange hub is required, on the one hand, and a cylindrical armature sleeve is required, on the other hand, which comprises absolutely all around sided completely smooth structural elements without any projections or recesses, which are unavoidable in the known structures, with which then the ring coupling element of the invention is joined.

A further likewise very decisive advantage of the present invention can be seen also in the fact, that the securing screws stand for the holding connection between the coupling element and the coupling parts, in accordance with the present invention, alternately in radial and axial direction, which includes the other coupling part consisting of an armature sleeve and coupling element can be connected. A third possibility can result also in the fact, that already the armature sleeve can be part of a device, a machine or the like, which must be equipped with a coupling. In this case the other part of the coupling, consisting of a flange hub and a coupling element, is connected with the available flange hub. Finally also a fourth and last application is also possible such, that the flange hub, as well as the armature sleeve are parts of devices, machines, or the like, which should be equipped with a coupling. It is then merely required to switch in between, the coupling element in the proposed manner of the invention.

In the coupling, according to the present invention, it is furthermore of advantage, that all securing screws with their screw head parts are set in the cross-section of the coupling element and are received within their receiving bushings, respectively. Due to this fact a compact structure without projecting parts is possible by arranging all required parts in the smallest space, so that this coupling of the present invention is excellently suitable to be set in at the points, where little space only is available.

Furthermore within the framework of the present invention, it is of importance, that the metal bushings for receiving securing screws, directed in axial direction, and received within the cross-section configuration of the cross-section of the coupling element are projectingly arranged, in the direction toward the coupling part sided securing engagement face opposite the coupling element, that means, the columnar connecting members between the bushings and the bushings to be secured in another direction. By this constructive measure it is brought about that the flexibility of the annular coupling element is completely retained.

In addition, for the practical realization of the present invention, it is suitable, if the longitudinal center axes of all securing screws standing in radial direction coincide with the center plane of the coupling element cross-section, related to the cross-section in axial extension, while the longitudinal center axes of all securing screws standing in axial direction are disposed in the cutting point of the longitudinal center axes of two adjacent coupling element columns extending on both sides of the bushings.

It is obtained with this structure, that no one-sided forces occur, rather all forces are practically centrally effective in the screws axes, what is likewise of importance for the function of the coupling likewise.

And finally, it is proposed within the framework of the present invention, to form the coupling element as at least at one point of its periphery, preferably within the range of one of its securing screw receiving bushings divided and open, respectively, as a coupling ring equipped with coupling means for the divisional connection. This measure is in-so-far of advantage and suitable because it is possible thereby, to turn around the coupling element about the armature sleeve, without necessity of a demounting of the coupling. This is, relative to the previously known coupling elements of a very decisive importance, since thereby the coupling elements are mountable by mere axial sliding-on.

If a coupling element is not axially but exclusively radially secured, wherefor no tensioning band is required, rather special flanges with particular recesses on both sides of the coupling element serves this purpose, the subject matter of the present invention has still a very decisive importance, since it combines the known advantages of a pure axial, as well as of the pure radial securing, and thereby a complete new way of securing a coupling element with surprising advantages is brought about.

In summary, it has been made possible by the invention, to create a coupling, which is particularly suitable by its constructive and manufacturing technical simplicity, rather also by its universal applicability for a number of application areas. It has been here obtained, by a minimum of expenditure not achieved until now, to obtain a real optimum on effect.

With these and other objects in view which will become apparent in the following detailed description, the present invention which is shown by example only will be clearly understood in connection with the accompanying drawings in which.

Figure 1:
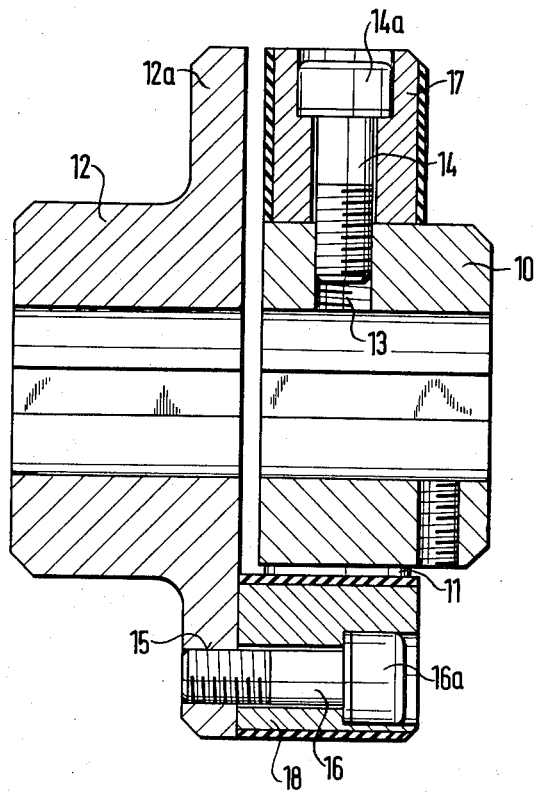
FIG. 1 is an axial section of the coupling designed in accordance with the present invention.

Referring now to the drawing, and in particular to FIG. 1, the coupling disclosed in the drawing comprises a cylindrical armature sleeve 10, an annular coupling element of elastic material by example of rubber and a flange hub 12.

The armature sleeve 10 is formed as a structural part which is all around smooth and free from projections, which is equipped with radially directed receiving member 13 for the reception of the securing screw 14. The flange hub 12 is likewise formed as all around smooth and structural part free of recesses, which part has merely in the flange 12a receiving bores 15 for the securing screws 16.

Figure 2:
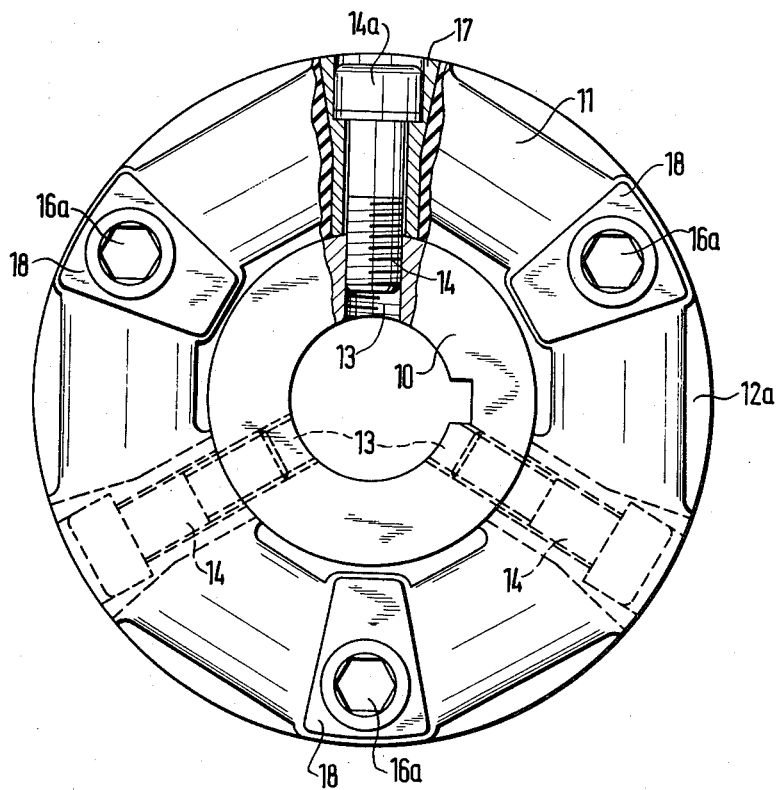
FIG. 2 is a front elevation of the coupling.
Figure 3:
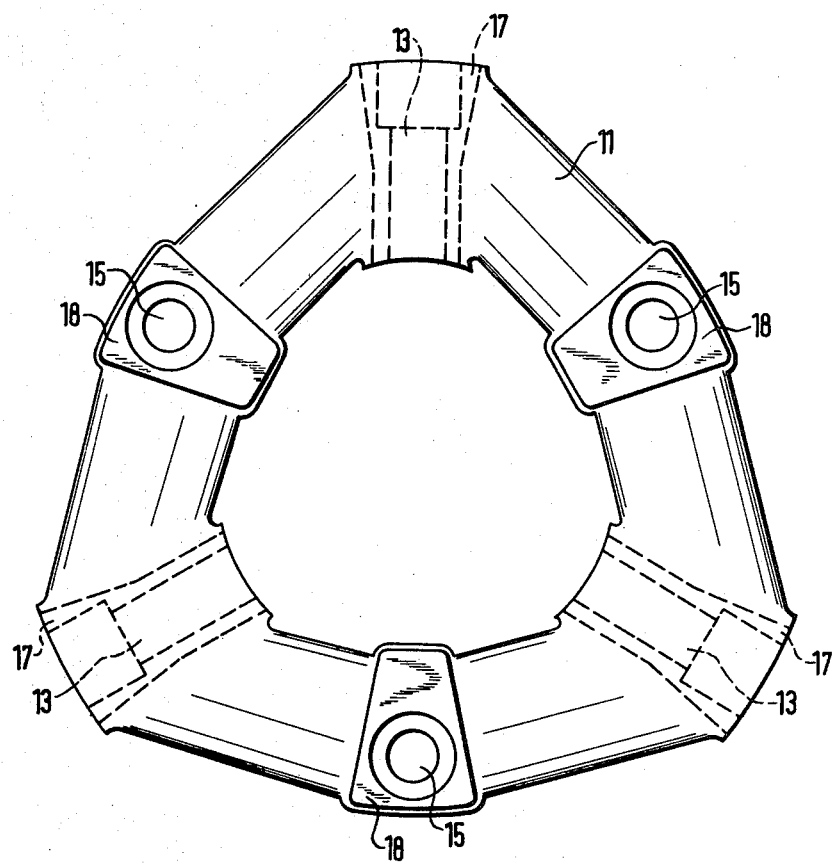
FIG. 3 is an elevation of a coupling element in its pretension-free state.

The flexible coupling element 11 has in its pretension-free state, in accordance with FIG. 3, the configuration of an irregular polygon, whereby for the securing of the coupling element 11, securing bushings 17 and 18 are worked in the coupling element 11, that their longitudinal axes of the bores stay alternately in radial and axial directions. The bushings 17 and 18 are received within the cross-section of the configuration of the coupling element 11 and project in screwing direction opposite the coupling element and the other bushings, respectively. In particular, as it is recognizable in FIGS. 1 and 2, the coupling element 11 is secured alternately by screws 14 and 16 extending in radial and axial direction engage the armature sleeve 10, while the securing screws 16 directed in axial direction engage the flange 12a. The screw heads 14a and 16a are received countersunk in the metallic connecting part 17 and 18, respectively, so that no projecting parts are present anymore.

It is to be understood that the shown and described embodiment is to be considered a possible example for the practical realization of the present invention, and is, however, by no means limited thereto. Rather it is within the framework of the present invention that other embodiments and applications are possible.

While I have disclosed one embodiment of the present invention, it is to be understood that this embodiment is given by example only and not in a limiting sense.

I claim:

1. A flexible coupling for torque transmission, comprising an annular coupling element of flexible material having metallic bushings for the reception of securing screws and disposed between the input side and the output side of the coupling, said coupling element is mountable free from pretension by said securing screws directed alternately in radial and axial direction, a cylindrical armature sleeve constituting one coupling part and being smooth and free of projections and recesses except threaded bores for said securing screws, as well as holding said securing screws disposed in radial direction, a flange hub constituting another coupling part and being smooth and free of projections and recesses except threaded bores in said flange hub for said securing screws, as well as holding said securing screws disposed in axial direction with a plane surface of a flange of said flange hub, said armature sleeve and said flange hub cooperating with each other, the elastic parts of said coupling have a pressure pretension by said securing screws disposed in radial direction, metal bushings directed in radial, as well as in axial direction and received within the cross-section configuration of the cross-section of said coupling element for the reception of said securing screws in the direction to its coupling-sided securing engagement face relative to said coupling element including columnar connecting members between said bushings secured in the other direction being disposed projectingly, and said coupling element having in its unmounted tension-free state the configuration of an irregular polygon.

2. The flexible coupling, as set forth in claim 1, wherein
all said securing screws are received counter sunk with their screw-head parts in the cross-section of said coupling element and within their receiving bushings, respectively.

3. The flexible coupling, as set forth in claim 1, wherein
the longitudinal center axes of all said securing screws extending in longitudinal direction coincide with the center plane of the cross-section of said coupling element, related to the cross-section in axial extension, while the longitudinal center axes of all said securing screws standing in axial direction are disposed in the crossing point of the longitudinal center axes of two adjacent coupling-element-columns extending on both sides of said bushings.

4. The flexible coupling, as set forth in claim 1, wherein
said coupling element is formed at least at one point of its periphery as a divided coupling ring equipped with coupling means for a division connection, and
said coupling ring is simultaneously held together and connected with the corresponding coupling hub.

5. The flexible coupling, as set forth in claim 4, wherein
said coupling element is formed as said coupling ring within the range of one of its receiving bushings for said securing screws.

* * * * *